(12) United States Patent
Ingalls et al.

(10) Patent No.: US 9,245,143 B2
(45) Date of Patent: Jan. 26, 2016

(54) SECURITY POLICY FOR DEVICE DATA

(75) Inventors: Dustin Michael Ingalls, Carnation, WA (US); Nathan J. Ide, Bothell, WA (US); Christopher R. Macaulay, Seattle, WA (US); Octavian T. Ureche, Renton, WA (US); Michael J. Grass, Sammamish, WA (US); Sai Vinayak, Tamilnadu (IN); Preston Derek Adam, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/370,232

(22) Filed: Feb. 9, 2012

(65) Prior Publication Data

US 2013/0212367 A1    Aug. 15, 2013

(51) Int. Cl.
G06F 21/00    (2013.01)
G06F 21/62    (2013.01)
G06F 21/88    (2013.01)

(52) U.S. Cl.
CPC ............ *G06F 21/6218* (2013.01); *G06F 21/88* (2013.01)

(58) Field of Classification Search
None
See application file for complete search history.

(56) References Cited

U.S. PATENT DOCUMENTS

| | | | |
|---|---|---|---|
| 5,675,645 A | 10/1997 | Schwartz et al. | |
| 6,292,899 B1 | 9/2001 | McBride | |
| 7,603,435 B2 | 10/2009 | Welingkar et al. | |
| 8,082,443 B2 | 12/2011 | Troxel et al. | |
| 2008/0235760 A1 | 9/2008 | Broussard et al. | |
| 2008/0282348 A1* | 11/2008 | Proudler et al. | 726/22 |
| 2009/0006867 A1 | 1/2009 | Choyi et al. | |
| 2009/0150970 A1 | 6/2009 | Hinds et al. | |
| 2009/0210456 A1 | 8/2009 | Subramaniam | |
| 2009/0328238 A1 | 12/2009 | Ridewood Glendinning | |
| 2010/0037291 A1 | 2/2010 | Tarkhanyan et al. | |
| 2010/0266132 A1 | 10/2010 | Bablani et al. | |
| 2011/0131406 A1 | 6/2011 | Jones et al. | |
| 2011/0252232 A1 | 10/2011 | De Atley et al. | |

FOREIGN PATENT DOCUMENTS

EP    1414215 A2    4/2004

OTHER PUBLICATIONS

Microsoft, "BitLocker Drive Encryption Technical Overview", Jul. 17, 2009, Microsoft, p. 1-17.*

(Continued)

*Primary Examiner* — Jeffery Williams
(74) *Attorney, Agent, or Firm* — Timothy Churna; Kate Drakos; Micky Minhas

(57) ABSTRACT

Techniques for providing security policy for device data are described. In implementations, data on a device is stored in an encrypted form. To protect the encrypted data from being decrypted by an unauthorized entity, techniques enable a decryption key to be occluded if an attempt to gain unauthorized access to device data is detected. In implementations, a decryption key can be occluded in a variety of ways, such as by deleting the decryption key, overwriting the encryption key in memory, encrypting the encryption key, and so on. Embodiments enable an occluded decryption key to be recovered via a recovery experience. For example, a recovery experience can include an authentication procedure that requests a recovery password. If a correct recovery password is provided, the occluded decryption key can be provided.

20 Claims, 5 Drawing Sheets

(56) References Cited

OTHER PUBLICATIONS

"BitLocker Drive Encryption in Windows 7: Frequently Asked Questions", Retrieved at <<http://technet.microsoft.com/en-us/library/ee449438(WS.10).aspx>>, Jan. 27, 2010, pp. 38.

"Windows Mobile Encryption and Recovery", Retrieved at <<http://blog.enterprisemobile.com/2009/01/windows-mobile-encryption-and-recovery/>>, Retrieved Date: Jan. 30, 2012, pp. 4.

Bradley, Tony, "Lock Down Your Android Devices", Retrieved at <<http://www.pcworld.com/businesscenter/article/209597/lock_down_your_android_devices.html>>, Nov. 3, 2010, pp. 5.

"International Search Report", Mailed Date: May 15, 2013, Application No. PCT/US2013/023353, Filed Date: Jan. 28, 2013, pp. 9.

"Extended European Search Report", EP Application No. 13747041.5, Sep. 24, 2015, 8 pages.

* cited by examiner

SECURITY POLICY FOR DEVICE DATA

BACKGROUND

Today's individual has access to a wide variety of devices that can be used to perform various tasks, such as work-related tasks, personal activities, recreational activities, and so on. While some devices may be dedicated to a particular purpose, such as a work-related purpose, many devices are considered "mixed-use" devices. For example, an individual's smartphone can be used to perform personal tasks, such as making personal phone calls, taking pictures, sending messages, and so on. The smartphone may also be used for work-related activities, such as sending and receiving work-related e-mails, reading and editing work documents, managing work contacts, and so forth.

One consequence of such mixed-use devices is that various types of data may be stored on a particular device. For example, a work-related document can be stored locally on a smartphone such that an individual can use the smartphone to view the document. While storing data locally on a device can provide an individual with convenient access to the data, it can also present a considerable security risk. For example, sensitive data stored on a device may potentially be exposed to an individual that obtains unauthorized possession of the device.

Some techniques for protecting data stored on a device respond to an indication of attempted unauthorized access to the data by simply erasing the data from the device. While this can be effective in certain circumstances to protect the data from unauthorized access, it can also result in a loss of important data. For example, consider a scenario where a child attempts to gain access to their parent's phone to play a game. A security functionality associated with the phone, such as limited retry logic or an enterprise server for policy enforcement, may interpret this attempt as an individual attempting to gain unauthorized access to sensitive data. In response, the security functionality can cause data on the phone to be erased. Not only can this result in a loss of important data, but it can present a considerable inconvenience in that a reconfiguration process may be implemented to return the device to a functional state.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for providing security policy for device data are described. In at least some implementations, data on a device is stored in an encrypted form. In order to be utilized by a functionality of the device (e.g., an application), the encrypted data is read from storage, decrypted using a decryption key, and provided to the functionality. To protect the encrypted data from being decrypted by an unauthorized entity, techniques enable a decryption key to be occluded if an attempt to gain unauthorized access to device data is detected. In implementations, a decryption key can be occluded in a variety of ways, such as by deleting the decryption key, overwriting the encryption key in memory, encrypting the encryption key, and so on.

Embodiments enable an occluded decryption key to be recovered via a recovery experience. For example, a recovery experience can include an authentication procedure that requests advanced authentication information from a user. Such advanced authentication information can include a high-entropy recovery password that can be retrieved by an authorized user. If a user provides a correct recovery password, the recovery experience can cause an occluded decryption key to be recovered, e.g., de-occluded. In implementations, after an occluded decryption key has been recovered, a user can provide standard authentication information to a device, such as part of a device logon experience. If the authentication is successful, the recovered decryption key can be used to decrypt data on the device such that the data can be accessed "in the clear" by the user and/or functionalities of the device.

Embodiments provide security policies that can be employed to protect data stored on a device from unauthorized access. For example, the security policies can specify that a decryption key for a device is to be occluded if a particular condition exists. Examples of such a condition can be related to a number of unsuccessful device logon attempts, an attempt to access encrypted data via an untrusted device, an explicit revocation of a decryption key and/or a security-related credential, a failure of a device to "check-in" at a particular time, and so on.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for providing security policy for device data are described. In implementations, data on a device is stored in an encrypted form. In order to be utilized by a functionality of the device (e.g., an application), the encrypted data is read from storage, decrypted using a decryption key, and provided to the functionality. To protect the encrypted data from being decrypted by an unauthorized entity, techniques enable a decryption key to be occluded if an attempt to gain unauthorized access to device data is detected. In implementations, a decryption key can be occluded in a variety of ways, such as by deleting the decryption key, overwriting the encryption key in memory, encrypting the encryption key, and so on.

Embodiments enable an occluded decryption key to be recovered via a recovery experience. For example, a recovery experience can include an authentication procedure that requests advanced authentication information from a user. Such advanced authentication information can include a high-entropy recovery password that can be retrieved by an authorized user. If a user provides a correct recovery password, the recovery experience can cause an occluded decryption key to be recovered, e.g., de-occluded. In implementations, after an occluded decryption key has been recovered, a user can provide standard authentication information to a device, such as part of a device logon experience. If the authentication is successful, the recovered decryption key can be used to decrypt data on the device such that the data can be accessed "in the clear" by the user and/or functionalities of the device.

Embodiments provide security policies that can be employed to protect data stored on a device from unauthorized access. For example, the security policies can specify that a decryption key for a device is to be occluded if a particular condition exists. Examples of such a condition can be related to a number of unsuccessful device logon attempts, an attempt to access encrypted data via an untrusted device, an explicit revocation of a decryption key and/or a security-related credential, a failure of a device to "check-in" at a particular time, and so on.

Having presented an overview of example implementations in accordance with one or more embodiments, consider now an example environment in which example implementations may by employed.

Example Environment

Figure 1:
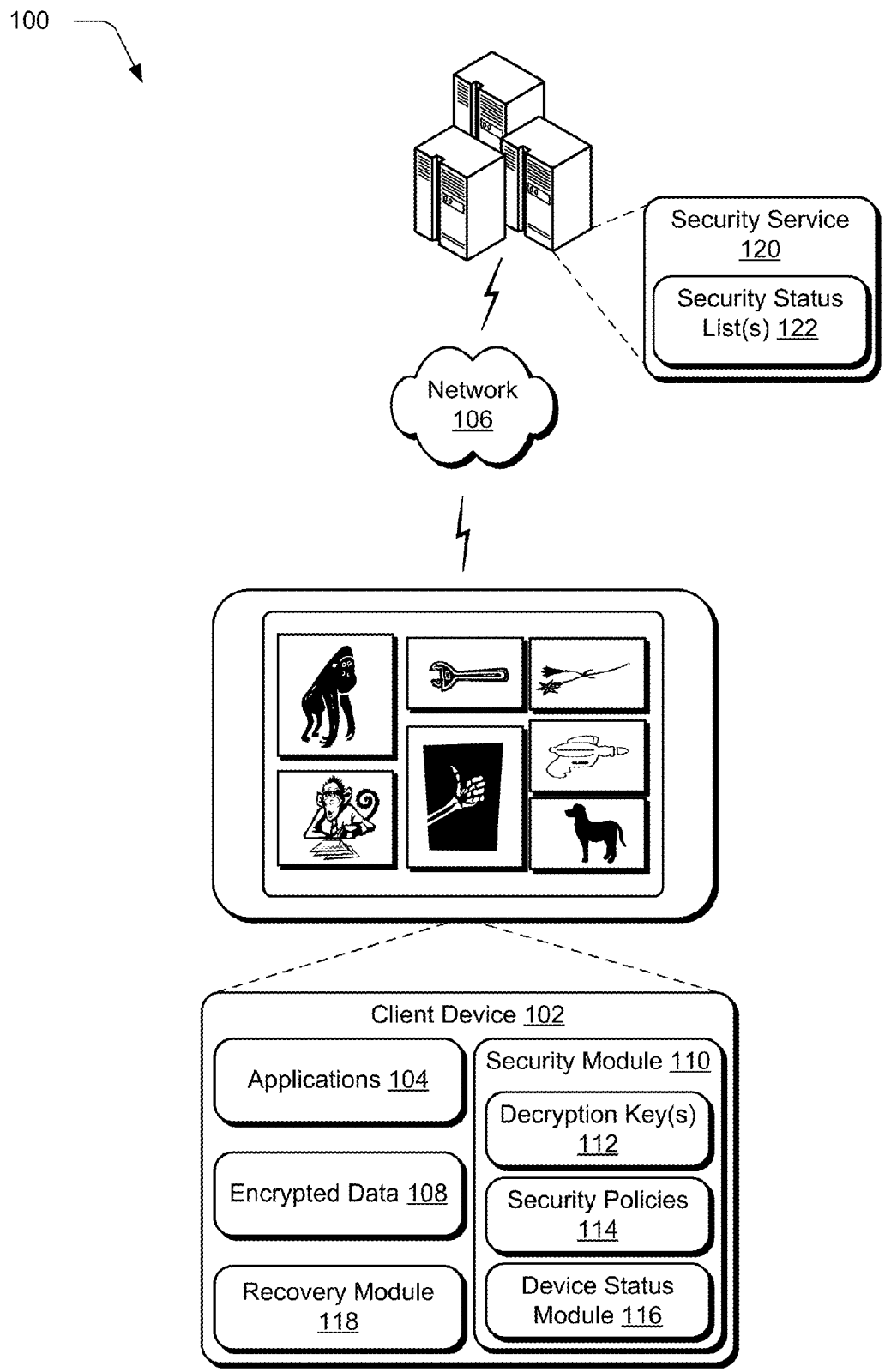
FIG. 1 is an illustration of an environment in an example implementation that is operable to employ techniques discussed herein.

FIG. 1 is an illustration of an environment 100 in an example implementation that is operable to employ techniques for providing security policy for device data. Environment 100 includes a client device 102 which can be embodied as any suitable computing device such as, by way of example and not limitation, a desktop computer, a portable computer, a handheld computer such as a personal digital assistant (PDA), mobile phone, tablet computer, and the like. A variety of different examples of the client device 102 are shown and described below in FIG. 5.

The client device 102 of FIG. 1 is illustrated as including applications 104, which are representative of functionalities to perform various tasks via the client device 102. Examples of such tasks include web browsing, word processing, email, content consumption (e.g., video and/or audio), social networking, and so forth. For example, the applications 104 can include a web browser, which is representative of functionality that is configured to navigate via a network 106. The network 106 may include and/or assume a wide variety of different configurations, such as the Internet, a wide area network (WAN), a local area network (LAN), a wireless network, a public telephone network, an intranet, and so on. Further, although a single network 106 is shown, the network 106 may be configured to include multiple networks. The applications 104, for instance, may be configured to navigate via the network 106 to interact with content available from a network resource as well as communicate data to a network resource, e.g., perform downloads and uploads.

Further illustrated as part of the client device 102 is encrypted data 108, which can be encrypted using a variety of different data encryption techniques. The encrypted data 108, for instance, can be stored on some form of computer-readable storage media that resides on the client device 102. Examples of such computer-readable storage media are discussed below with reference to FIG. 5. In implementations, the encrypted data 108 can include user and/or enterprise data, such as content (images, video, audio, and so on), documents, contacts, email, and so forth. The encrypted data 108 can also include system data, such as operating system (OS) data, system files for the client device 102, application files (e.g., executables), and so forth.

The client device 102 further includes a security module 110, which is representative of functionality to manage and/or perform various security-related tasks for the client device 102. For example, the security module 110 can be configured to encrypt data for the client device 102 such that the data can be stored as part of the encrypted data 108. Various types of data can be encrypted by the security module 110 and included as part of the encrypted data 108, examples of which are provided above.

The security module 110 includes at least one decryption key 112, which is representative of a portion of data that can be employed to decrypt the encrypted data 108. For example, the security module 110 can decrypt the encrypted data 108 using the decryption key 112 to put the data in a form that can be recognized by a human (e.g., human-readable form), used by the applications 104 to perform a task, and/or employed by the client device 102 as part of performing system-level operations.

Further included as part of the security module 110 are security policies 114, which are representative of conditions and/or events that can trigger security procedures. For example, if the security module 110 detects a violation of one of the security policies 114, the security module 110 can cause the decryption key 112 to be occluded. Examples of the security policies 114 are discussed in detail below.

The security module 110 further includes a device status module 116, which is representative of functionality to monitor and/or report state information for the client device 102. For example, one or more of the security policies 114 can specify a particular state condition for the client device 102. If a variation in the particular state condition is detected by the device status module 116, the device status module 116 can provide a notification that one of the security policies 114 has been violated.

For instance, the device status module 116 can track identifiers for various components of the client device 102, such as a processor, a memory device, an input/output device, and so on. Thus, the device status module 116 can maintain a profile of known components for the client device 102. If the device status module 116 detects that an unknown component is attempting to interact with the client device 102, the device status module 116 can trigger a violation of one of the security policies 114. For instance, the device status module 116 can detect that an unknown central processing unit (CPU) or untrusted CPU configuration is attempting to access data stored on the client device 102, such as the encrypted data 108. In response, the security module 110 can cause the decryption key 112 to be occluded such that the unknown CPU can be prevented from accessing the decryption key 112 and decrypting the encrypted data 108. Examples of other state-related information are presented below.

Further included as part of the client device 102 is a recovery module 118, which is representative of functionality to enable an occluded security key to be recovered. For example, if the decryption key 112 is occluded in response to a violation of one of the security policies 114, the recovery module 118 can initiate a recovery procedure that can enable the decryption key 112 to be recovered, e.g., de-occluded. Detailed examples of a recovery procedure are discussed below.

The environment 100 further includes a security service 120, which is representative of functionality to manage and/or perform security procedures for an entity. The security service can be implemented by a remote resource that can communicate with the client device 102 via the network 106. For example, the security service 120 can manage security procedures for an enterprise entity (e.g., a business) associated with a user of the client device 102. The security service 120 includes at least one security status list 122, which tracks security statuses for various items. For example, the security status list 122 can specify whether a trusted status of a particular item has been revoked, such as a client device, a security key, a digital certificate, a security credential, and so on.

The security service 120, for instance, can receive an indication that the client device 102 may be in the possession of an unauthorized individual. For example, an authorized user of the client device 102 can notify the security service 120 that the client device 102 has been lost or stolen. The security service 120 can cause a trusted status of the client device 102 to be revoked, which can be recorded in the security status list 122. For instance, the security service 120 can revoke the decryption key 112, which can be marked in the security status list 122 as having been revoked. When the client device 102 checks-in with the security service 120, the client device 102 can access the security status list 122 and detect that the decryption key 112 is revoked. In response, the security module 110 can cause the decryption key 112 to be occluded. Alternatively or additionally, the security service 120 can push a notification of a revoked item to the client device 102, such as by pushing a copy of the security status list 122 to the client device 102.

Having described an example environment in which the techniques described herein may operate, consider now a discussion of some example procedures in accordance with one or more embodiments.

Example Procedures

The following discussion describes example procedures for providing security policy for device data in accordance with one or more embodiments. In portions of the following discussion, reference will be made to the environment 100 of FIG. 1.

Figure 2:
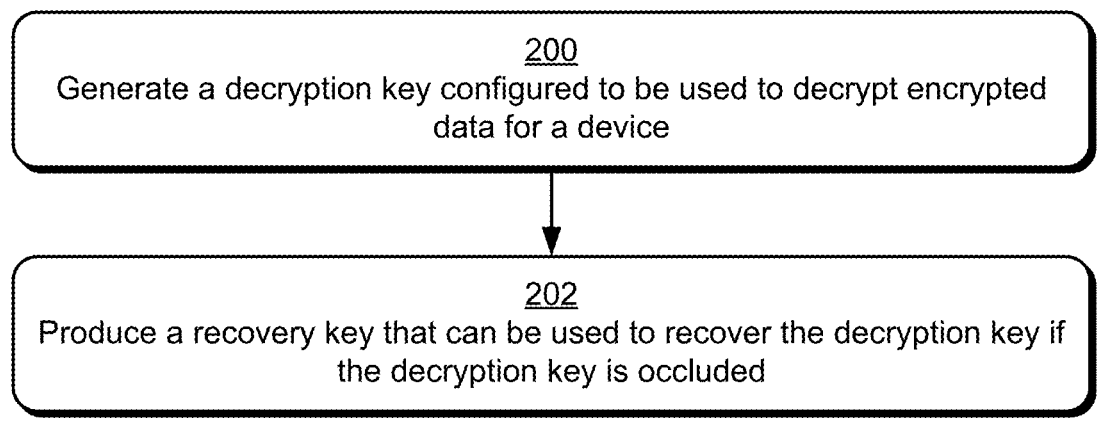
FIG. 2 is a flow diagram that describes steps in a method in accordance with one or more embodiments.

FIG. 2 is a flow diagram that describes steps in a method in accordance with one or more embodiments. In implementations, the method describes an example way of configuring a device to protect a security key.

Step 200 generates a decryption key configured to be used to decrypt encrypted data for a device. For example, the security module 110 can generate the decryption key 112, which can be used to decrypt the encrypted data 108. Step 202 produces a recovery key that can be used to recover the decryption key if the decryption key is occluded. For example, the decryption key can be encrypted to occlude it in response to a violation of a security policy. The recovery key can be provided as part of a recovery procedure that can be employed to recover the occluded decryption key, as discussed in more detail below.

Figure 3:
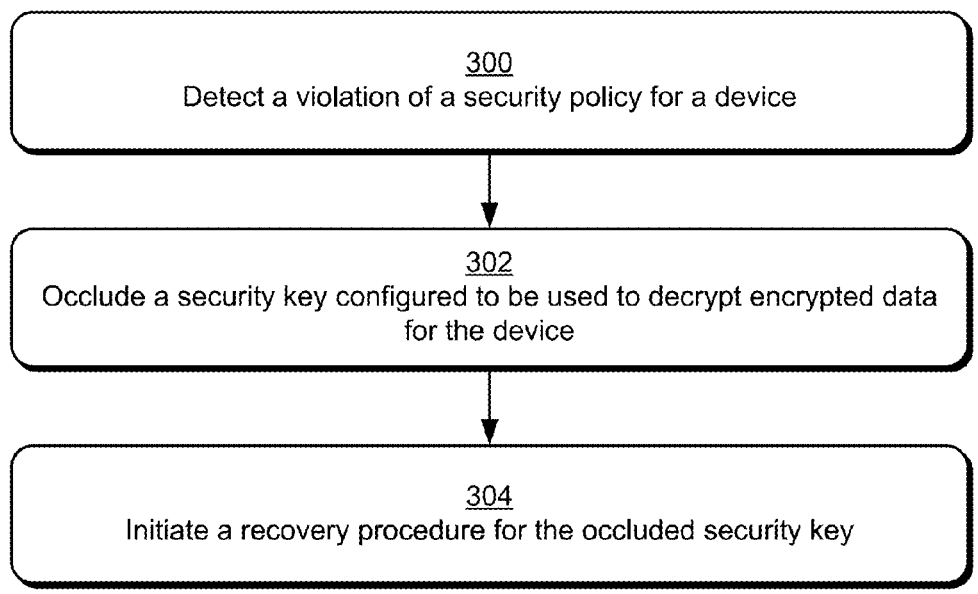
FIG. 3 is a flow diagram that describes steps in a method in accordance with one or more embodiments.

FIG. 3 is a flow diagram that describes steps in a method in accordance with one or more embodiments. In implementations, the method describes an example way of protecting data from unauthorized access.

Step 300 detects a violation of a security policy for a device. For example, the security module 110 can detect a violation of one or more of the security policies 114. Example security policies are discussed in the following section. In implementations, a particular security policy may not be based on an explicitly-stated policy, but may be based on an interpretation of an event or condition as posing a potential security risk.

Step 302 occludes a security key configured to be used to decrypt encrypted data for the device. For example, the security module 110 can occlude the decryption key 112 in response to detecting a violation of a security policy for the client device 102.

In implementations, a security key can be occluded using a variety of different techniques. For example, a security key can be occluded by erasing and/or overwriting with random values a portion of memory that stores the security key.

Alternatively, a security key can be occluded by encrypting the security key, e.g., using an intermediate security key. Thus, to recover an encrypted security key, a user can provide the intermediate security key and/or a private key associated with the intermediate key. For example, a user could enter the intermediate security key using some form of input mechanism. Alternatively or additionally, the user could provide an indication of where the intermediate security key is located, such as a remote and/or protected storage location from which the intermediate security key can be retrieved. For example, the intermediate security key could be stored by the security service 120. If a recovery procedure is successfully performed to recover the encrypted security key, the intermediate key can be retrieved by the client device 102 from the security service 120 and used to decrypt the encrypted security key.

A number of different variations can be employed to ensure that a security key that has been occluded cannot be retrieved by an unauthorized entity. For example, a portion of memory that stores a security key can be overwritten (e.g., multiple times) with random data in response to an indication of a violation of a security policy. This can serve to further obscure or occlude security key values that are written to the portion of memory.

As another variation, a security key can be divided into sections (e.g., split), and each of the sections can be stored in a separate portion (e.g., sector) of memory. Thus, if an erase or overwrite operation fails on one portion of memory, the other portions of the security key can be erased and/or overwritten on the other portions of memory. For example, if a memory sector failure prevents one portion of memory that stores a piece of the security key from being erased or overwritten, other memory sectors can still be erased and/or overwritten to prevent all portions of the security key from being exposed to an unauthorized entity.

Step 304 initiates a recovery procedure for the occluded security key. For example, the recovery module 118 can launch a recovery procedure that can enable the decryption key 112 to be recovered after it is occluded. An example recovery procedure is discussed in detail below.

In at least some implementations, a determination is made as to whether a recovery key is persisted to at least one external location (e.g., external to the client device 102) prior to implementing the security key occlusion procedure. If it cannot be determined whether the security key has been persisted to another location, some implementations may avoid occluding the security key. For example, a client device may remain in a primary authentication (e.g., logon) mode.

Figure 4:
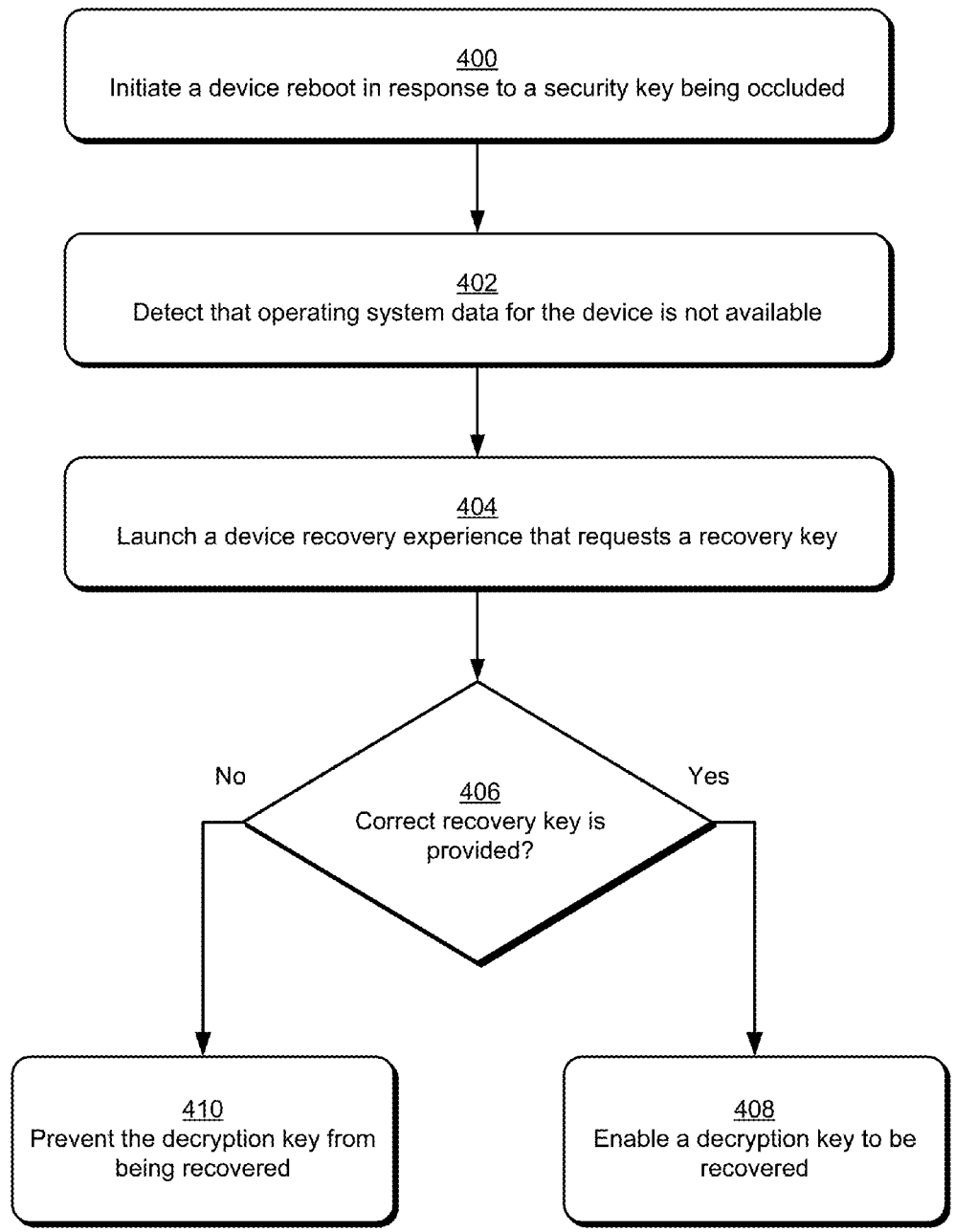
FIG. 4 is a flow diagram that describes steps in a method in accordance with one or more embodiments.

FIG. 4 is a flow diagram that describes steps in a method in accordance with one or more embodiments. In implementations, the method describes a detailed way of performing step 304 of the method discussed above with reference to FIG. 3.

Step 400 initiates a device reboot in response to a security key being occluded. For example, the security module 110 can initiate a reboot for the client device 102 in response to the decryption key 112 being occluded based on a violation of one of the security policies 114.

Step 402 detects that operating system data for the device is not available. For example, operating system (OS) data for the client device 102 can be stored in an encrypted form, such as part of the encrypted data 108. Thus, in typical functioning scenarios where the decryption key 112 is not occluded, the OS data can be read from storage and decrypted with the decryption key 112. The decrypted OS data can then be loaded (e.g., into primary memory) as part of booting the client device 102 to enable the client device 102 to perform various tasks for the client device 102. In a scenario where the decryption key 112 has been occluded, however, the OS data cannot be decrypted and loaded.

Step 404 launches a device recovery experience that requests a recovery key. For example, a boot loader for the client device 102 can detect that the OS data is not available, and can notify the recovery module 118 to initiate a recovery experience. The recovery module 118 can provide a prompt for a recovery key, such as a graphical user interface (GUI) that is displayed via the client device 102 and that prompts a user to provide a recovery key. In implementations, the recovery module 118 is stored on the client device 102 in the clear (e.g., not encrypted), so that the device recovery experience can be launched in an event that the decryption key 112 is occluded. For example, the recovery module 118 can be implemented in firmware on the client device 102.

In implementations, a recovery key includes information that can be accessed by a user of the client device 102, but that is not readily available to the client device 102. For example, the recovery key can be a long (e.g., 48 characters or more), high-entropy password that is not stored on the client device 102. Alternatively or additionally, the recovery key can include other forms of authentication, such as bio-authentication, smart card authentication, radio-frequency identification (RFID) via an RFID device, answering a challenge question, and so on.

As another example, a recovery key can be accessed as part of a separate authentication experience. For example, a user can provide a separate password and/or other authentication factor to the security service 120. If the authentication factor is correct, the user can be provided with the recovery key, and/or the recovery key can be automatically communicated from the security service 120 to the client device 102. As yet another example, a recovery key may be retrieved by enterprise personnel associated with a device, such as a system administrator, information technology (IT) personnel, and so on.

Step 406 determines whether a correct recovery key is provided. If a correct recovery key is provided, step 408 enables a decryption key to be recovered. For example, the client device 102 can be rebooted into a standard device logon experience that requests logon information, such as a standard password. In implementations, a standard password may refer to a low-entropy password. For example, a standard password can be a four-digit personal identification number (PIN) that can be used to unlock a device. If a user successfully recovers the decryption key 112, the client device 102 can be booted and the decrypt key 112 used to decrypt the encrypted data 108. Alternatively or additionally, the logon experience may be incorporated into the recovery experience.

In implementations, recovering a security key that has been occluded can be based on how the security key was occluded. For example, if a security key was occluded by being erased and/or overwritten in memory, the security key can be retrieved from a remote resource, e.g., the security service 120. Alternatively, if a security was encrypted with an intermediate security key, the intermediate security key can be retrieved and used to decrypt the security key.

Returning to step 406, if a correct recovery key is not provided, step 410 prevents the decryption key from being recovered. For example, the client device 102 can remain in the recovery experience mode and waiting for a correct recovery key. Alternatively or additionally, if a threshold number of attempts to provide a correct recovery key fail, the client device 102 can cause a memory wipe that erases and/or overwrites some or all of the data stored on the client device 102, which may include wiping decryption key 112.

As an alternative implementation to the recovery procedure discussed above, a decryption key may be retrieved from a resource remote from a client device. For example, a decryption key may be retrieved from the security service 120 by enterprise personnel associated with a client device, such as a system administrator, information technology (IT) personnel, and so on.

Having discussed some example procedures, consider now a discussion of some example security policies in accordance with one or more embodiments.

Security Policies

A variety of different security policies can be employed to protect data associated with a device from unauthorized access. For example, security policies can be based on a number of different device-related considerations, such as device authentication state, device hardware state, device connectivity status, and so on. Discussed below are some example security policies that can be implemented in accordance with one or more embodiments, e.g., as part of the security policies 114 discussed above. Further, the security policies can be enforced, entirely or in part, by the client device 102 and independent of a remote resource. The example security policies are not intended to limit the claimed embodiments, and are presented for purpose of illustration only.

Failed Authentication

In implementations, a device can employ a logon procedure that enables a user to access data and functionalities of the device. For example, when a device is powered-on and/or wakes from a hibernation mode, a logon prompt can be presented that requests a password or other authentication factor. If a user provides a correct authentication factor, the user can be permitted to access data and functionalities of the device. For example, with reference to the client device 102, providing a correct authentication factor can enable access to and/or permit the ongoing use of the decryption key 112 such that the encrypted data 108 can be decrypted and utilized.

If a user fails to provide a correct authentication factor, however, the device can block access to data and/or functionalities. For instance, a failure to provide a correct authentication factor can cause the device to remain in a logon experience such that data and other functionalities of the device are not available unless the correct authentication factor is provided.

In implementations, a security policy can be employed that is based on a number of failed logon attempts associated with a device. For example, a threshold number of failed logon attempts for a device can be pre-specified. If a number of actual failed logon attempts reaches and/or exceeds the threshold number (e.g., five failed logon attempts), the device can be locked such that further logon attempts are not permitted and a violation of a security policy is triggered. For example, with reference to the client device 102, the security module 110 can cause the decryption key 112 to be occluded. Further, the recovery module 118 can initiate a recovery procedure, as discussed above. In at least some embodiments, the threshold number of logon attempts is configurable. For example, a variety of different entities can specify the threshold number, such as a user, a network administrator, IT personnel, and so on.

When tracking a number of failed logon attempts, embodiments can consider a variety of different logon techniques as part of a total number of failed logon attempts. For example, if an individual fails to provide a correct password, and then fails to provide a correct thumbprint, and further fails to correctly respond to a challenge question, these can be counted as three failed logon attempts. Thus, a number of failed logon attempts can be cumulative based on different logon techniques and/or authentication factors. Further, failed logon attempts can be based on logon attempts from multiple different users.

Implementing such a security policy can prevent an unauthorized user from repeatedly guessing at a password and/or providing different authentication factors in an attempt to gain unauthorized access to device data and/or functionality.

Revocation of Trusted Status

In implementations, a security policy can specify that a trusted status of a device-related item can be revoked. Examples of such a device-related item include the device itself, a digital certificate used by the device, a security key associated with the device, a security credential, and so on.

In an example implementation, a security policy can specify that the client device 102 is to periodically query the security service 120 for revocation information, such as a revocation status of an item listed in the security status list 122. If the revocation information indicates that a trusted status of the client device 102 has been revoked, the decryption key 112 can be occluded and a recovery procedure initiated. As referenced above, a trusted status of a device can be revoked in response to a user indicating that the device has been lost or stolen. Additionally or alternatively, the trusted status can be revoked based on an indication that a security key, a digital certificate, and/or other security-related item has been compromised.

In implementations where a device may enter a hibernation and/or sleep mode, the device can be configured to automatically emerge (e.g., wake up) from such a mode to query for revocation information. For example, a revocation interval (e.g., every 4 hours) can be specified, after which a device is to query for revocation information. If the revocation interval expires while the device is in a sleep mode, the device can automatically awake and query for revocation information. Thus, techniques enable a variety of entities to monitor a trusted status of a device, and to revoke the trusted status of a device to protect device data from unauthorized access.

In at least some embodiments, revocation information can be pushed from a remote resource to a client device. For example, the security service 120 can push revocation data to the client device 102, e.g., as part of a notification. Alternatively or additionally, a remote resource can access functionality of a device to initiate a procedure to occlude a security key. For example, the security service 120 can detect that one of the security policies 114 has been violated. In response, the security service 120 can communicate with the security module 110 as a trusted entity (e.g., based on a trusted digital certificate) and prompt the security module to occlude the decryption key 112. Thus, implementations can enable a client device to receive revocation information independent of a query by the client device for the revocation information.

Compulsory Check-in

In implementations, a security policy can be employed that specifies that if a device does not check-in, a security key associated with the device is to be automatically occluded. For example, the security module 110 can be configured to periodically check-in with the security service 120, e.g., to query for revocation information and/or to confirm that the device 102 is currently in a trusted state. If the security module 110 attempts to check-in after a check-in interval has expired and cannot contact the security service 120, the security module 110 can trigger a security policy violation. For example, the security module 110 can occlude the decryption key 112 and/or lock the device 102 such that device data cannot be accessed.

Employing such a check-in procedure can enable data to remain secure in scenarios where a device has lost network connectivity and thus cannot communicate with a remote service to check for revocation information. Such a scenario can arise when an unauthorized user obtains a device and prevents the device from communicating with a remote resource, such as by disabling network communication functionality of the device.

Device State

In implementations, a security policy can be employed that specifies that if a variation occurs in a particular device state condition, the security policy has been violated. Example device state conditions include hardware state, software state, network state, and so on.

With reference to hardware state, hardware identifiers can be logged and monitored for various known hardware components of a device. If unknown hardware attempts to interact with a device (e.g., to obtain device data), a notification of a violation of a security procedure can be generated. For example, an unauthorized user can remove a data storage device from the client device 102, and connect the data storage device to a different device. The unauthorized user, for instance, can attempt to access device data from the data storage device using the different device. The device status module 116 can be stored on the data storage device, and can detect that an unknown device is interacting with the data storage device. The device status module 116 can notify the security module 110 of the unknown device, which can cause the decryption key 112 to be occluded to prevent the unauthorized user from accessing the decryption key 112 and decrypting the encrypted data 108.

Software state can include various software-related conditions. For example, a software state can include an update status of an application, such as an indication of patches that are installed for the application. In implementations, a patch can be available for an application (e.g., from an application developer) that can fix a security vulnerability of the application. Thus, if it is determined that an available patch is not installed for the application, the device status module 116 can trigger a security policy violation to prevent exposing the client device 102 to a possible security risk.

Another software state can relate to a trusted status of a particular piece of software. If the software is indicated as untrusted (e.g., in the security status list 122), a violation of a security policy can be triggered.

A further software state can refer to recommended software that is specified as being indicative of a healthy running environment. For example, security-related software (e.g., antivirus software) can be employed to verify that malware is not present on a device. If the recommended software is not present and/or running on the device, a security policy violation can be triggered.

Network state can refer to various network-related conditions, such as a particular network to which a device is connected, a network resource (e.g., a website) that a device is accessing, and so on. If an unsafe network condition is detected, a violation of a security policy can be triggered. For example, if the device status module 116 detects that the client device 102 is communicating with an untrusted server and/or an untrusted website, the device status module 116 can trigger a security policy violation.

Time Clock Status

In implementations, a security policy can be employed that specifies that if a time-related variation occurs, the security policy has been violated. For example, an unauthorized user can attempt to modify a time parameter associated with a device, such as the actual device time. The unauthorized user, for instance, can attempt to roll back the device time to avoid triggering a particular security-related event. With reference to the periodic device check-ins discussed above, the unauthorized user may attempt to implement the time roll back to avoid triggering a security policy violation that can occur if a device fails to check-in after a check-in interval expires.

Thus, implementations can employ a time verification mechanism that monitors for time-related variations. For example, a time clock can be implemented as a trusted time device, such as in trusted hardware and/or firmware that resides on a client device. The trusted time device, for instance, can be implemented as a Trusted Platform Module (TPM) device. If it is detected that the time clock is not functioning as expected, a security policy violation can be triggered. For instance, a malfunctioning time clock can be an indication of possible tampering by an unauthorized entity in an attempt to alter device time and/or another time parameter. Thus, if potential time clock tampering is detected, a security policy violation can be triggered.

Geographic Position

In implementations, a security policy can be employed that specifies geographic parameters for a device. For example, a client device can employ functionality to determine a geographic location of the client device. Examples of such functionality include global positioning system (GPS) functionality, cell phone triangulation functionality, network-based positioning, and so on.

A geographic security policy can specify that if a device is outside of a particular geographic area, the security policy is being violated. For example, an enterprise entity can define a geographic area associated with the entity, such as a defined area around a physical facility. If a client device is detected outside of the defined geographic area, a violation of a security policy can be triggered. Further, an attempt to obtain geographic position information may fail, e.g., due to device positioning functionality being disabled. In implementations, if a client device cannot obtain geographic position information, a violation of a security policy can be triggered.

As another example, a particular geographic region can be specified as unsafe, e.g., associated with an untrusted entity. If a device is determined to be in an unsafe geographic region, a violation of a security policy can be triggered. Thus, security policies can be specified for a device to control access to device data based on a location of the device.

Having discussed some example security policies, consider now a discussion of some implementation variations in accordance with one or more embodiments.

Implementation Variations

A number of different variations on the implementations discussed herein can be employed in accordance with one or more embodiments.

Hardware-Based Security

In implementations, various security procedures can be implemented within hardware to protect data from unauthorized access. For example, a data storage device associated with a client device can be configured to perform data encryption and decryption within the device itself. In such implementations, the data storage device can store and utilize a decryption key within the data storage device itself. Since the data storage device performs decryption internally, the data storage device need not release the decryption key to other components, such as an OS for a client device. Thus, if an unauthorized user tries to access the decryption key from the data storage device, the data storage device can occlude the decryption key independent of software executing on a host client device.

Automatic Occlusion

In implementations, a security key can be automatically occluded in response to various events. For example, when a device enters a particular mode, an encryption key for the device can be occluded in response. Examples of such modes include a locked mode, a sleep mode, a hibernation mode, and so on. In implementations, a device can enter a locked mode in response to a user action, such as providing input requesting that the device enter the locked mode.

To recover an occluded encryption key after a device emerges from such a mode, the device can communicate with a remote resource to confirm its status. For example, when the client device 102 emerges from such a mode, the security module 110 can query the security service 120 for a security status of the client device 102. If the security status indicates that a trusted status of the client device 102 has not been revoked, the decryption key 112 can be restored to the client device 102. Otherwise, if the trusted status of the client device 102 has been revoked and/or an attempted connection to the security service 120 fails, the client device 102 can launch a recovery procedure. An example recovery procedure is discussed above.

Having discussed some example implementation variations, consider now a discussion of an example system and device in accordance with one or more embodiments.

Example System and Device

Figure 5:
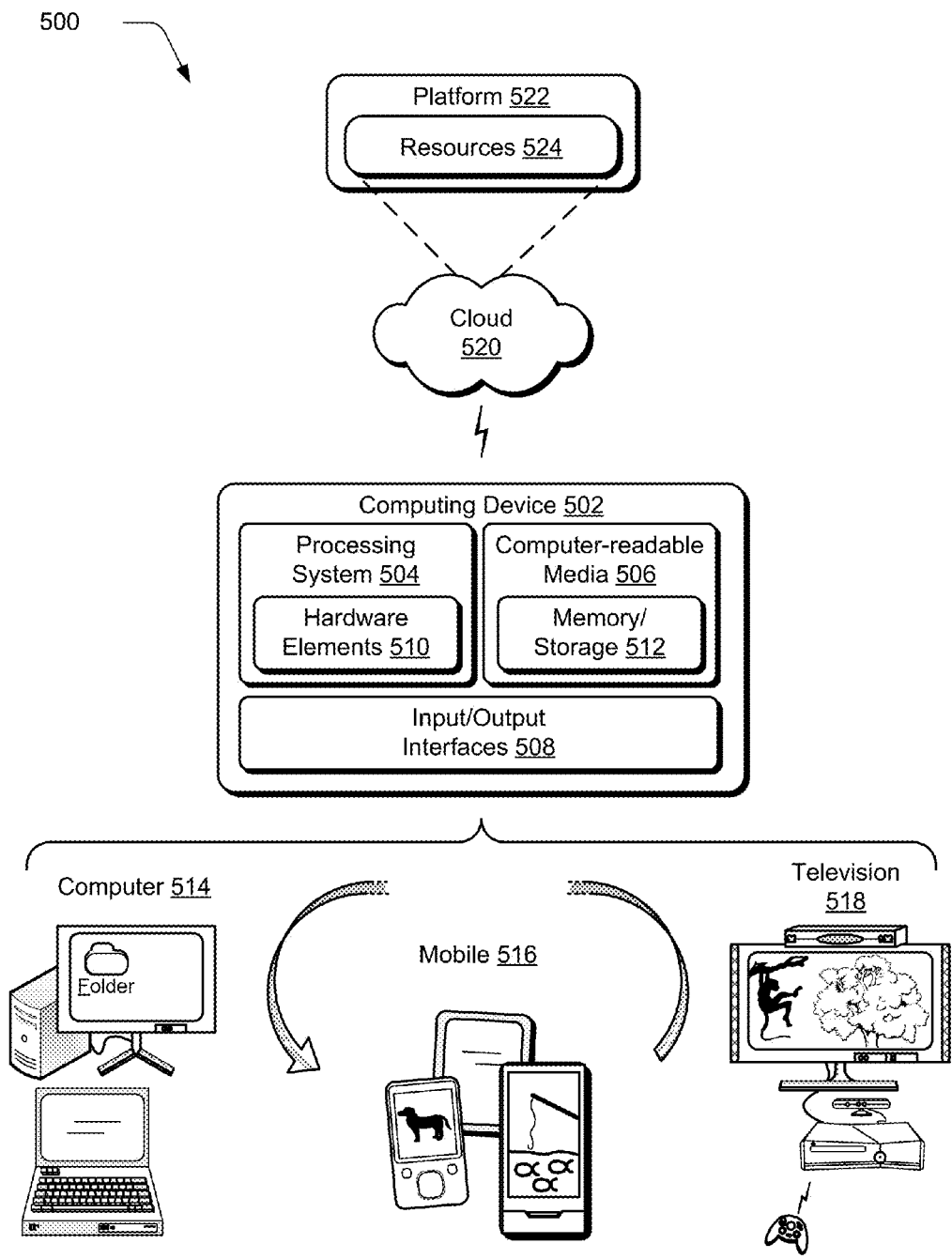
FIG. 5 illustrates an example system and computing device as described with reference to FIG. 1, which are configured to implement embodiments of techniques described herein.

FIG. 5 illustrates an example system generally at 500 that includes an example computing device 502 that is representative of one or more computing systems and/or devices that may implement various techniques described herein. For example, the client device 102 discussed above with reference to FIG. 1 can be embodied as the computing device 502. The computing device 502 may be, for example, a server of a service provider, a device associated with the client (e.g., a client device), an on-chip system, and/or any other suitable computing device or computing system.

The example computing device 502 as illustrated includes a processing system 504, one or more computer-readable media 506, and one or more Input/Output (I/O) Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media does not include signal bearing media. The computer-readable storage media includes hardware such as volatile and nonvolatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules that are executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. For example, functionalities discussed with reference to the client device 102 and/or the security service 120 may be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for providing security policy for device data are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
one or more hardware processors; and
one or more computer-readable storage devices having instructions stored thereon that, responsive to execution by the one or more hardware processors, cause the one or more hardware processors to:
maintain at least one decryption key for the computing device;
attempt to check-in with a remote security service;
ascertain that the computing device cannot contact the remote security service;
cause the at least one decryption key to be occluded in response to said ascertaining that the computing device cannot contact the remote security service; and
present in response to occlusion of the decryption key a graphical user interface on the computing device that includes a prompt to provide a recovery key for recovering the decryption key.

2. A system as described in claim 1, wherein the instructions are further executable by the one or more hardware processors to decrypt operating system data to enable the computing device to boot an operating system.

3. A system as described in claim 1, wherein the instructions are further executable by the one or more hardware processors to maintain the at least one decryption key by storing one portion of the decryption key in a first sector of memory, and storing another portion of the decryption key in a second, different sector of memory.

4. A system as described in claim 1, wherein the instructions are further executable by the one or more hardware processors to decrypt the at least one decryption key in response to an input of either an intermediate security key or a private key associated with the intermediate key.

5. A system as described in claim 1, wherein the instructions are further executable by the one or more hardware processors to monitor one or more states of the computing device such that a variation in the one or more states triggers a violation of one or more of the security policies.

6. A system as described in claim 1, wherein the instructions are further executable by the one or more hardware processors to launch a recovery experience that enables the decryption key to be recovered in response to the recovery key being provided as part of the recovery experience.

7. A system as described in claim 1, wherein the instructions are further executable by the one or more hardware processors to:
cause the at least one decryption key to be occluded in response to the device entering a mode comprising at least one of a locked mode, a sleep mode, or a hibernation mode; and enable the decryption key to be recovered when the device emerges from the mode by checking the remote security service for a security status of the device.

8. A computer-implemented method, comprising:

detecting a violation of a security policy for a device;

occluding, by one or more hardware processors and in response to said detecting, a security key of the device by encrypting the security key with an intermediate security key;

causing, in response to said occluding, a graphical user interface to be displayed on the computing device that enables a user to specify a location of the intermediate security key includes a prompt to provide a recovery key for recovering the security key;

receiving user input to the graphical user interface identifying a protected location where the intermediate security key is located;

retrieving the intermediate security key from the protected location; and decrypting the security key using the intermediate security key.

9. A method as described in claim 8, wherein the security policy specifies a threshold number of failed logon attempts for the device, and wherein said detecting comprises detecting that a number of logon attempts for the device that have failed has reached the threshold number.

10. A method as described in claim 9, wherein the number of logon attempts for the device that have failed are based on two or more different types of authentication factors.

11. A method as described in claim 8, wherein said detecting comprises detecting that a trusted status of the device has been revoked.

12. A method as described in claim 8, wherein said detecting comprises detecting that the device has failed to check-in with a remote security service.

13. A method as described in claim 8, wherein said detecting comprises detecting a variation in a state of the device, the state comprising one or more of a hardware state, a software state, or a network state.

14. A method as described in claim 8, wherein said detecting comprises detecting a time-related variation for the device.

15. A method as described in claim 8, wherein said security policy is associated with a geographic location of the device.

16. A computer-implemented method, comprising:

causing, by one or more hardware processors, a security key residing on a computing device to be occluded in response to receiving an indication that the computing device has failed to check in with a remote security service;

launching, by the one or more hardware processors, a recovery experience in response to an indication that the security key is occluded, the recovery experience requesting a recovery key for recovering the occluded security key;

determining whether a correct recovery key is provided as part of the recovery experience; and enabling the security key to be recovered if the correct recovery key is provided.

17. A computer-implemented method as described in claim 16, wherein the indication that the security key is occluded comprises an indication that operating system data for the device is not available.

18. A computer-implemented method as described in claim 16, wherein the security key is occluded by encrypting the security key, and wherein, if the correct recovery key is provided, the security key is decrypted for the device using an intermediate security key.

19. A system as described in claim 1, wherein the instructions are further executable by the one or more hardware processors to attempt, by the computing device, periodic check-ins with the remote security service.

20. A computer-implemented method as described in claim 16, further comprising attempting periodic check-ins with the remote security service.

* * * * *